United States Patent [19]

Holtz

[11] Patent Number: 4,818,268

[45] Date of Patent: Apr. 4, 1989

[54] OSMOPROTECTANT

[75] Inventor: R. B. Holtz, Morgan Hill, Calif.

[73] Assignee: Spawn Mate, Inc., Capitola, Calif.

[21] Appl. No.: 106,960

[22] Filed: Oct. 14, 1987

Related U.S. Application Data

[63] Continuation-in-part of Ser. No. 16,508, Feb. 17, 1987, abandoned, Continuation of Ser. No. 776,770, Sep. 16, 1985, abandoned.

[51] Int. Cl.$^4$ .............................................. C05F 11/00
[52] U.S. Cl. .............................................. 71/5; 71/11; 71/64.11; 71/904; 430/254; 430/244
[58] Field of Search ................. 71/5, 11, 23, 903, 904, 71/64.11; 47/1.1; 435/244, 254; 424/20, 22

[56]  References Cited

U.S. PATENT DOCUMENTS

| 4,370,159 | 1/1983 | Holtz | 71/5 |
| 4,420,319 | 12/1983 | Holtz | 71/5 |
| 4,421,543 | 12/1983 | Holtz | 71/5 |

FOREIGN PATENT DOCUMENTS 0134081  3/1985  European Pat. Off. .

Primary Examiner—Ferris H. Lander
Attorney, Agent, or Firm—Thomas E. Schatzel

[57]  ABSTRACT

An osmoprotectant particle for use in enhancing fungus growth and particularly for use with edible mushrooms. The osmoprotectant particle includes a carrier particle, either a protein or a neutral material and a plurality of osmoprotectant microdroplets containing water soluble phosphoglyceride such as hydroxy lecithin and betaine or choline which are attached to a plurality of recesses formed about the carrier particle. Denaturation of the protein and/or control of a surface-to-volume ratio restricts access to the microdroplets such that only mushroom mycelia occuring in the later flushes will be able to utilize the phospholipid droplets. A method is provided for producing the osmoprotectant particles utilizing either the protein carrier particle or the neutral carrier particle.

16 Claims, 2 Drawing Sheets

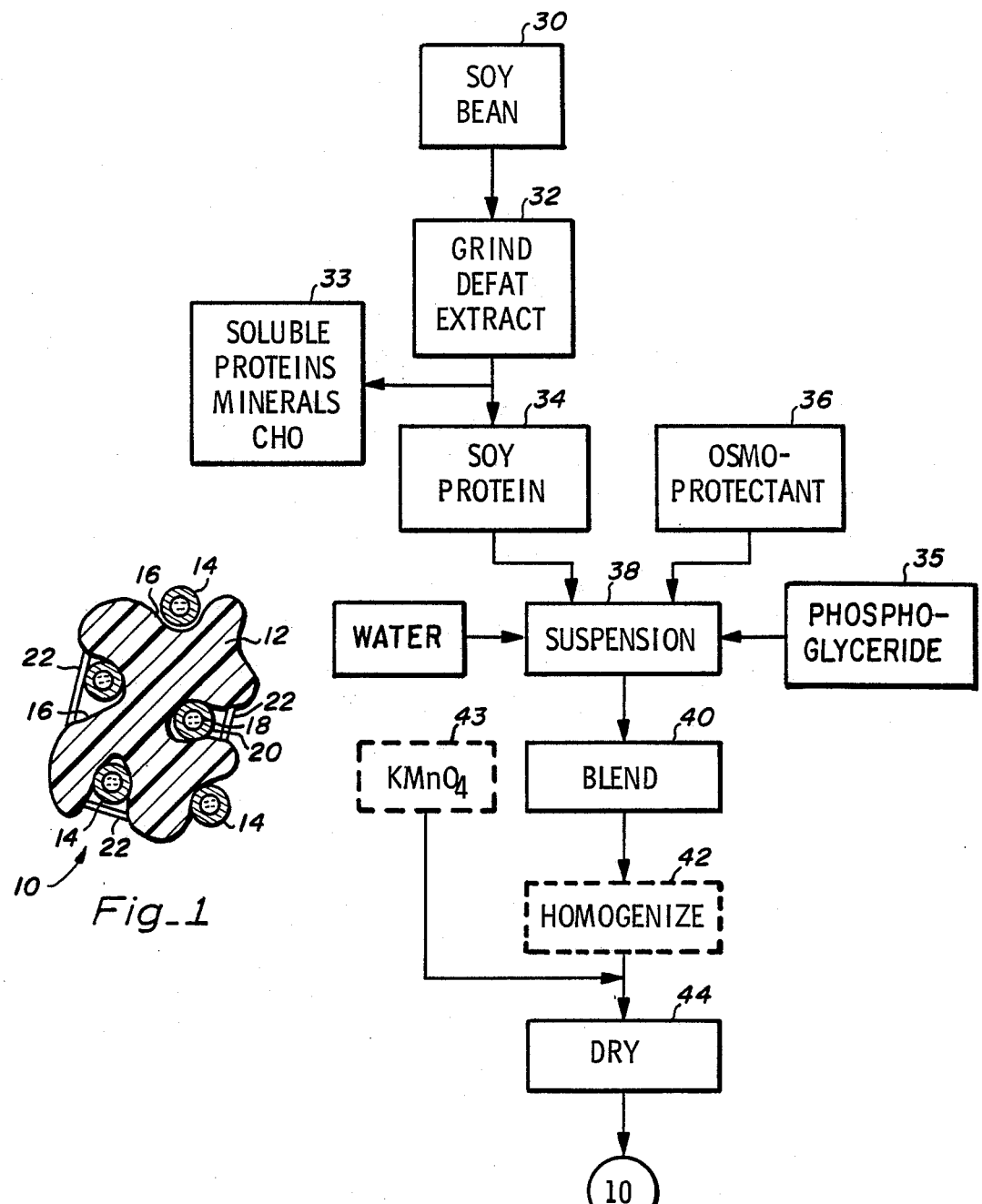
Fig_1
Fig_2

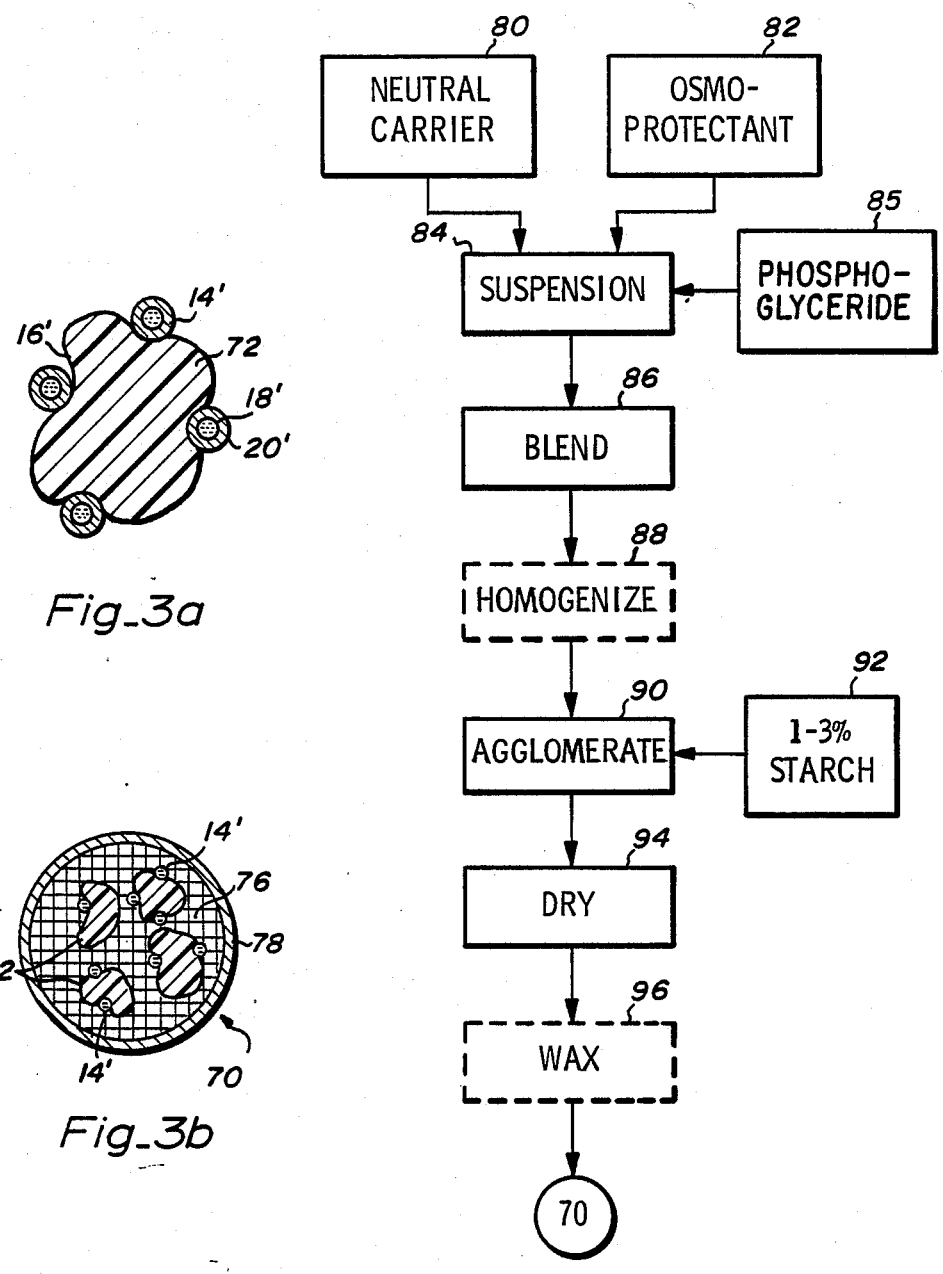
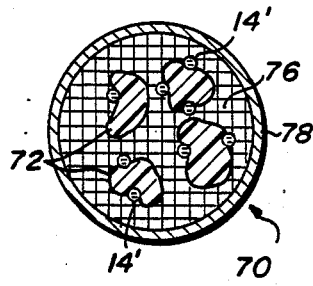
Fig_3a
Fig_3b
Fig_4

OSMOPROTECTANT

This is a continuation-in-part of co-pending application Ser. No. 07/016,508 filed on Feb. 17, 1987 and now abandoned which is a continuation of Ser. No. 776,770, filed Sept. 16, 1985 and now abandoned.

BACKGROUND OF THE INVENTION

1. Field of the Invention

The present invention relates generally to nutrient additives for biological systems and more specifically to an additive for enhancing and prolonging mushroom growth and extending cropping, and to methods for producing such additive.

2. Description of the Prior Art

Millions of pounds of commercially produced, edible mushrooms, are grown and consumed annually in the United States. Commercial mushroom production is divided into several stages, with the first stage being the preparation of the media or compost upon which the mushrooms will grow. The compost is prepared by an aerobic fermentation process in outdoor piles at temperatures in excess of 165° F. The compost is then subjected to an indoor pasturization process and cooled below 80° F. At this point the compost is inoculated with mycelia which have been separately grown on a grain substrate such as rye or millet. This process is known as "spawning". The mycelia are allowed to colonize the compost for a two to three week period following the inoculation. Subsequently, the compost is covered with a thin layer of peat moss and a calcium carbonate buffer. This process is called "casing" and the peat moss layer is called the casing layer. Approximately twenty days after casing, the mushroom begins to produce the fruiting bodies or sporophores which are harvested and sold commercially as the edible mushrooms.

Because disturbing the spawn after it has been cased can have detrimental effects upon the production of fruiting bodies, the most advantageous time for the mushroom grower to add exogenous components to the compost is at the time of spawning, when such components may be freely admixed with the compost. However, it is not desiraable to have some types of materials, such as delayed release nutrients, biologically available until later in the crop (i.e. at the time of fruiting). Mushroom are grown in a series of crop cycles called "breaks" or "flushes". A typical mushroom compost preparation will produce three, four or five such flushes occuring at about one week intervals. However the latter flushes tend to produce lesser amounts and lower quality mushrooms.

The prior art has been directed toward the development and preparation of adjuvants intended primarily as delayed release nutrients to supply the mycelia with a good source prior to and during the first. An additional problem is present during the latter flushes which has not yet been addressed by the art. It is well-known tht the osmotic potential of the compost and casing layer increases during the later periods of the crop cycle, primarily during the third, fourth and fifth flush. The increase in osmotic potential is brought about by the secretion of metabolites and salts from the large biomass of mycelia growing in the casing layer and in the compost. As a response to this adverse biochemical environment, the mycelia cells synthesize ergosterol, a cholesterol-type compound tht is deposited in the cell membrane. Ergosterol synthesis has been noted in a paper by R. B. Holtz and D. E. Smith, presented at the proceeding of the *Tenth International Congress of the Science and Cultivation of Edible Fungi*, Part 1, 1979, page 437. The cell membrane, which is the primary regulator of metabolite transport into and out of the cell, becomes less permeable due to the ergosterol formation. This reduction of transport acts as a defense mechanism to protect the cell. However, reduced transport also means reduced mycelial activity and subsequently reduced production of mushroom fruiting bodies. Therefore, the yield of mushroom tissue declines both in quality and quantity in the later breaks because the mycelia cannot supply the expanding fruiting bodies with biochemical raw materials for cell synthesis and with water for cellular expansion.

It has been reported in the literature, for example, by Le Rudulier and R. C. Valentine, Trends in Biochemical Science, Volume 7, page 431, 1982, that some bacteria respond to increased osmotic stress by the production of osmoprotective compounds, betaine and glycylcholine. The importance of this fact is that the organism must take up and/or synthesize osmoprotectant compounds such as at the time of osmotic stress. To provide these compounds prior to this time would not result in osmoprotectant activity, rather the compounds would enter other metabolic pathways and be used for other purposes.

Recent experiments with bacteria have shown that the addition of these osmoprotective compounds to in nutrient media can encourage growth even in situations where the salt content of the media exceeds the tolerance for normal growth. (See Le Rudulier, Strom, Dandekar, Smith and Valentine, *Science*, Volume 224, page 1064, 1984). Choline and betaine have been shown to protect cultures of *E. coli* against osmotic stress in high salt media. In higher plants, betaine has been shown to protect a root symbiont, *Rhizobium meliloti* as a free living organism and in the form of a nodulated seedling.

None of the prior art has however, shown that betaine and choline would have a similar effect in higher fungi, specifically *Basidiomycetes*. Furthermore, none of the prior art has applied the results of these studies toward the development of a functional osmoprotectant for fungi, which may be added to a commercial mushroom spawn and which would viably protect the later flushes against the effects of increased osmotic stress.

SUMMARY OF THE INVENTION

Accordingly, it is an object of the present invention to provide a protective additive which will ameliorate the effects of osmotic stress in mushroom cultures.

It is a further object of the present invention to provide an additive which will have a delayed release effect, thereby supplying the osmoprotective materials when they are needed.

It is another object of the present invention to provide an osmoprotectant additive which may be admixed with spawn during composting.

It is yet another object of the present invention to provide an additive which can increase both the quality and quantity of fruiting bodies produced during the later flushes of the crop yield.

It is a further object of the present invention to provide a simple and efficient method for preparing such osmoprotectant additive particles.

Briefly, a preferred embodiment of the present invention includes a particle comprising a plurality of droplets of an osmoprotectant material such as betaine or choline which are compounded with a carrier material such as protein or a neutral material. The particle also includes from about one-half to three percent of a water soluble phosphoglyceride such as hydroxy lecithin which serves to orient the betaine or choline on the carrier particle ans as a source of biologically available choline. The final product is dried to contain about six to eight percent water, and may also include a thin wax coating to further control the delayed release of the osmoprotectant materials.

The invention further includes a method for preparing the additive particle. The method includes first preparing a carrier particle, either a soy protein or a neutral material and adding to this an osmoprotectant droplet comprising a phospholipid such as lecithin, or betaine plus lecithin. The osmoprotectant mixture is homogenized, and blended with the carrier to create a combined particle. A denaturant agent is added to the protein carrier particle in order to further control the delayed release of the osmoprotectant. If the carrier particle comprises a neutral material, the carrier particles are coagglomerated with approximately 1 to 3% starch, and subsequently dried. A thin wax coating may also be added to the surface of either particle to further control the delayed release of the nutrient.

The resulting particle may then be added either to the compost for mushrooms or be directly brought into contact with immature spawn prior to planting.

An advantage of the present invention is that osmotic stress in the media is reduced, thus improving nutrient uptake.

Another advantage of the present invention is that the osmoprotectant may be added either at the compost stage or at the spawn stage and is released at the appropriate time.

Another advantage of the present invention is that mushroom yield and quality is improved during the later flushes.

Another advantage of the present invention is that the osmoprotectant particle may be produced simply and efficiently using readily available materials.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a schematic cross-sectional view of an idealized osmoprotectant particle utilizing a protein carrier;

FIG. 2 is a flowchart diagram of a method for preparing the osmoprotectant particle of FIG. 1;

FIG. 3a is a cross-sectional schematic view of an idealized alternative embodiment of the osmoprotectant particle;

FIG. 3b is a cross-sectional schematic of view of an idealized combination particle of the alternative embodiment of the present invention; and FIG. 4 is a flowchart diagram of a method for preparing the alternative embodiment of the osmoprotectant particle of FIGS. 3a and 3b.

DETAILED DESCRIPTION OF THE PREFERRED EMBODIMENT

FIG. 1 represents an idealized cross-sectional schematic of an osmoprotectant particle designated by the general reference character 10. It may be seen from FIG. 1 that the osmoprotectant particle 10 is generally spherical in shape and includes two discrete components, namely a protein carrier particle 12, and a plurality of osmoprotectant droplets 14. The protein carrier particle 12 serves as a matrix for the osmoprotectant droplets 14 and is irregular in shape. The exterior surface of the carrier particle 12 is convoluted and includes a plurality of recessed attachment sites 16, which provide loci for the attachment of the lipid droplets 14 to the protein carrier 12.

The osmoprotectant droplets 14 are generally spherical in shape and substantially smaller than the protein carrier 12. Typically, the droplets 14 range from one hundred twenty-five to two hundred and fifty microns in size. Each droplet 14 comprises relatively nonpolar core 18 which is surrounded by an osmoprotectant layer 20. The core 18 is comprised of the relatively nonpolar hydrocarbon tails of a water soluble phosphoglyceride. The osmoprotectant layer 20 comprises the polar heads of the phosphoglyceride (phospholipid) to which a first osmoprotectant material can be chemically bonded. A second osmoprotectant material can be admixed with the first osmoprotectant material in the layer 20.

In the preferred embodiment, the phosphoglyceride is hydroxy lecithin (centrolene A) and the osmoprotectant layer 20 comprises choline, which is part of the lecithin, and a second osmoprotectant betaine. In hydroxy lecithin, the nonpolar hydrocarbon tails of the lecithin molecule have been hydroxylated, thus rendering them slightly less nonpolar than in unhydroxylated lecithin. The nonpolar core 18 is comprised of these hydroxylated hydrocarbon tails and the osmoprotectant layer 20 comprises a mixture of choline, supplied by the polar head of the hydroxy lecithin molecule, and betaine.

In alternative embodiments, the phosphoglyceride can be other water soluble phosphoglycerides and the second osmoprotectant material can comprise other compounds or combinations of compounds such as: glycine betaine, betaine aldehyde, trimethyl-amino butyrate, dimethyl glycine, proline and proline-betaine.

While a number and variety of proteins may be used as the protein carrier particle 12, the protein utilized in the particle 10 is a by-product of soy protein manufacture. This may be produced as an end product of soy protein isolate manufacture. This protein material is highly insoluble and forms a very absorbent grit-like material. Commercially available soy protein in this form may be obtained from a number of sources, including for example Ralston Purina and Archer Daniel Midlands, in a variety of particle sizes, between twenty and one hundred mesh (Tyler sieve).

Because the protein 12 is a folded linear arrangement, a number of attachment sites for the osmoprotectant droplets 14 are present at various locations about the protein, both internal and external. Thus, the phospholipid droplets are protected from early mycelial attack by the convolutions of the tertiary structure of the protein carrier particle 12. To further isolate the osmoprotectant droplets 14, a denaturant is added to create a plurality of cross links 22 which are represented in idealized fashion in the particle 10 of FIG. 1.

The osmoprotectant particles 10 can be used as an additive at the time of spawning, either alone or in conjunction with a delayed release nutrient such as, for example, those disclosed in U.S. Pat. Nos. 4,370,159 or 4,420,319, both invented by the same inventor as the invention herein, and assigned to Spawn Mate, Inc., the assignee of the present invention. The osmoprotectant particle 10 should be admixed to the compost at the time of spawning, and is distributed throughout the compost by any of the several mechanical mixing processes as known in the art. Such mechanical mixing processes are necessary to adequately disperse the particles. The optimum concentration of the osmoprotectant 10 can be expressed as a percentage of the dry weight of the compost per square foot of bed area. By this computation, the optimum concentration for particles of the osmoprotectant 10 is between eight-tenths and one and two-tenths percent. This gives an effective concentration of approximately 0.001 molar on a dry weight basis.

The osmoprotectant particle 10 will not change the conditions of the spawn run or period between casing and first harvest of the mushrooms. The only cultural changes in be expected will be somewhat higher compost temperatures during the later breaks or flushes. The osmoprotectant particles 10 give the mushroom mycelia the ability to remain biologically active during the later period of the crop cycle, when the soluble salts from metabolic activities are at their highest concentration, by giving the cell the ability to balance the osmotic pressure inside the cell with that of the environment. It has been proposed that some osmoprotectants may also serve as stabilizers of proteins and enzymes that may lose their function as a result of osmotic stress.

FIG. 2 represents a schematic flow chart of a method for preparing the osmoprotectant particle 10. The process starts with the preparation of the soy protein carrier, in which soy beans 30 are subjected to a grinding, defatting and extraction stage 32 wherein soluble proteins, minerals and carbohydrates 33 are removed leaving a soy protein material 34 which is between twenty and thirty percent protein. These protein materials are highly insoluble and absorbant, and form a grit-like material which may be selected to have a particle size between twenty and one hundred mesh. A phosphoglyceride 35 and a second osmoprotectant 36 are added to the soy protein material 34 along with enough water to form a suspension 38 which is approximately one half to three percent phosphoglyceride, five hundredths to three percent second osmoprotectant 36, ten to thirty percent water, and sixty-five to ninety percent soy protein 34. The suspension 38 is subjected to a blending step 40 utilizing either a conventional ribbon blender or a V-type (Patterson-Kelley) blender. Blending times are usually approximately twenty minutes depending on the type of blender. In an optional homogenization step 42, the blended mixture is homogenized utilizing a conventional homogenizer, ultrasonic disintegrator, or a high speed, high-shear blender. In a second optional step, an aqueous solution of about one percent potassium permanganate 43 is added to the homogenized mixture to increase the total added moisture to approximately thirty percent. The potassium permanganate acts as an oxidative denaturant to the protein to further restrict mycelia access to the phospholipid droplets.

Finally, the homogenate is subjected to a drying step 44 wherein the product is dried in a fluid bed-type dryer yielding the finished osmoprotectant particle 10. Product temperature is regulated to be between 140° and 160° F. This typically requires an inlet temperature of approximately 250° F. and a residence time of about three minutes.

An alternative embodiment of the osmoprotectant particle is illustrated in schematic in FIGS. 3a and 3b and designated by the general reference character 70. Those elements of the osmoprotectant particle 70 which are common to the preferred embodiment carry the same reference numeral distinguished by a prime designation. The particle 70 is illustrated in FIG. 3b and is a combination particle comprising a plurality of carrier particles 72 each of which is comprised of a relatively biologically inert material, specifically, a nonprotein material which is not subject to denaturization. The material selected to comprise the carrier particles 72 should include a plurality of surface or internal convolutions 16' and may consist of, for example, carboxymethylcellulose, a clay material sold under the tradename Kaolin, diatomaceous earth, silicates such as vermiculite, and various cross-linked polysaccharides. Attached to the neutral carrier particle 72 are a plurality of osmoprotectant droplets 14', each comprising a microdroplet 18', comprising the hydrocarbon tails of a phospholipid and a layer of an osmoprotectant material 20'. As with the particle 10, the preferred embodiment utilizes hydroxy lecithin as the phosphoglyceride and the osmoprotectant layer 20' comprises betaine and choline which is chemically bonded to the lecithin molecule. The neutral carrier particle 72 is relatively inert. Thus, the droplets 14' cannot be further isolated by a denaturing process. Therefore, the delayed release of the osmoprotectant materials supplied by the particle 70 is accomplished by regulation of particle size which decreases the surface to volume relationship and thus slows assimilation of the particle 70 by the mycelia. The neutral carrier particle 72 is accordingly chosen to be approximately one hundred and fifty times larger than the osmoprotectant droplets 14'. Isolation is further accomplished by agglomerating a number of neutral carrier particles 72 plus attached osmoprotectant droplets 14' to form the combination particle 70, which includes a plurality of neutral carrier particles 72, the osmoprotectant droplets 14' attached thereto, and an encapsulation of a starch 76. The combined particle has a surface to volume ratio of between twenty-four hundredths and eighteen hundredths square millimeters per cubic millimeter to control release at the third break. It is to be noted that this range may be varied depending on the release time desired. It is to be further noted that the above surface to volume range presently appears to be optimal, but other ranges can also be used to practice the invention.

The droplets 14' may be further isolated from the mushroom mycelia by surrounding the combination particle with a thin layer of a neutral wax 78.

FIG. 4 represents a schematic flow chart diagram for a method of producing the combination osmoprotectant particle 70. The process is begun by mixing a neutral carrier material 80 with one tenth to three percent of the osmoprotectant material 82, for example, betaine or choline, to form a suspension 84. Approximately one half to three percent phosphoglyceride is then added, represented by the broken-lined box 85, may be added. The neutral carrier material may be, for example, carboxymethylcellulose, a fine clay, various silicates such as diatomaceous earth and vermiculite or various cross linked polysaccharides, and makes up about sixty-five to ninety percent of the suspension 84. The suspension 84 is blended at blending step 86 for approximately twenty minutes using apparatus as described for the particle 10. In an optional step 88, the blended suspension is homogenized in, for example, a conventional homogenizer, ultrasonic disintegrator, or a high speed, high shear blender. Following homogenization, the particles are subjected to an agglomeration step 90. The agglomeration step comprises introducing the homogenate into an aggomerator, which may be, for example, a fluid-bed type, tower-type or a KG-Schugi mixer agglomerator, and spraying the homogenate with a solution 92 of between one to three percent soluble starch. The agglomeration process increases the particle size from approximately one hundred mesh to a size of between twenty and sixty mesh by aggomerating a plurality of particles 72 to form the combination particles 70, and increases the final moisture to between twenty-eight and thirty-four percent. Following the agglomeration step 90, the combination particles 70 undergo a drying step 94 wherein the particles are dried in a fluid-type bed dryer to reduce final moisture of the product between six and seven and one-half percent. The temperature of the dryer should not exceed approximately one hundred degrees Fahrenheit (F) due to the nature of the starch solution 92. If desired to additionally isolate the osmoprotectant droplets 14' from the mushroom mycelia, the dried combination particles 70 may be subjected to a waxing step 96 (illustrated by broken lines), wherein a thin coating of a neutral wax 78, such as a paraffin, is applied to the combination particles 70. The wax 78 can be solubilized in a neutral solvent such as a low boiling petroleum and sprayed into the fluid bed agglomerator at ambient temperature. The solvent can then be removed from the particle by carefully heating the air stream to approximately one hundred degrees F. for about three minutes. While paraffins or solvent-soluble hydrocarbon derivatives are preferred, other waxes, such as microcrystalline waxes, would also be applied via a solvent solution. Emulsifiable synthetic waxes could be emulsified in an aqueous solution, blended with the product and dried. The drying process would remove residual moisture. The paraffin and low-melting-point waxes could also be applied by heating to the melting point, and spray-coating on the particles 70.

EXAMPLE 1

The production of mushroom tissue occurs in breaks or flushes which occur approximately one week apart. A typical mushroom crop continues for five breaks, after which point the yields have diminished to a point where recovery of the crop is no longer economically feasible. The quality, usually represented by size, color and firmness, also deteriorates as a function of prolonged cropping time. One of the primary reasons for this deterioration in yield is the inability of the mycelia to transport nutrients and water from the compost encasing layer and to translocate them to the site of growth of the fruiting body. Experiments with spawn grown in submerged cultures have shown that the normal growth at 80° F. will cease after a period of twenty eight days. These cultures were grown in shake flask culture or in fermentors. When betaine or choline and/or lecithin were added to these cultures after twenty-eight days, growth continued for a period totaling thirty seven days.

Osmoprotectant materials were prepared as described above for the preferred embodiment and with the following specific percentages:
Soy Material, 83.2%
Lecithin, 0.6%
Betaine-HCl, 0.1%
Water, 16%
Potassium Permanganate, 0.1%

The particles were admixed to the compost along with a delayed release nutrient comprising a microencapsulated phospholipid material in a protein matrix, substantially as described in U.S. Pat. No. 4,370,159 issued to Holtz. Yield data showed a forty-two percent increase in the yield of the fourth break as compared to a control, representing a total yield increase of twenty-two hundreths pounds per square foot. EXAMPLE 2:

Experiments were conducted to compare the hydroxy-lecithin/betaine osmoprotectant particles to the delayed release nutrient particles of the prior art. Data was collected for three combinations of particles over a period of time which included three breaks of a mushroom crop. In the first combination, a delayed release nutrient without an osmoprotectant was added to the compost. This nutrient was a commercial preparation of the nutrient described in U.S. Pat. Nos. 4,370,159 and 4,421,543 (which are incorporated herein by reference) and is called "Nutrient" in the discussion that follows. Specifically, the Nutrient contained about 46.7% soy protein concentrate, 5.6% calcium caseinate, 2.6% sodium acetate, 43.9% soy and/or cottonseed oil and about 1.3% lecithin. The Nutrient was added to the compost during spawning such that the ratio of dry weight of Nutrient to dry weight of compost was 6%.

The second combination contained an Osmoprotectant I and Nutrient in an amount such that the ratio of dry weight of Osmoprotectant I plus Nutrient to dry weight of compost was 6%.

The third combination contained an Osmoprotectant II and Nutrient in an amount such that the ratio of dry weight of Osmoprotectant II plus Nutrient to dry weight of compost was 6%.

The Osmoprotectant I was prepared by dissolving twelve pounds of RP-Grit (Soy grit), 6.0 grams of betaine and 80.0 grams of centrolene A (hydroxy lecithin) in 700 ml of water and blending for ten minutes with a ribbon blender. Six grams of $KMnO_4$ were dissolved in 600 ml of water and added to the Osmoprotectant solution in the ribbon blender and stirred for an additional 10 minutes. The whole solution solution was then dryed in a batch fluid bed dryer with an inlet temperature of 205° F. until the outlet temperature reached 105° F.

The Osmoprotectant II was prepared identically to Osmoprotectant I but without the addition of $KMnO_4$ and the additional 600 ml of water.

Compost was prepared on a four week outdoor composting cycle beginning with baled wheat straw and following the "synthetic" practice of composting. Approximately 100,000 lbs. of wheat straw was broken from the bales and stacked in loose heaps and watered. These heaps were flipped with a loader and water over a three week period. This "preconditioning" period caused the straw to start composing and breaking down. Temperatures in the heaps could rise to as much as 130° F. After the third week the straw was piled into "ricks" approximately 6'w×6'h×300'1. This rick was then able to be mechanically turned, aerated and watered by a specialized composting machine. To the straw was added 14,000 lbs. of cottonseed meal, 14,000 lbs. of gypsum, 23,000 lbs. of cottonseed hulls, and 15,000 lbs. of dried poultry waste. The pile was turned every other day for seven days. Pile temperatures reached as high as 180° F. The compost was then filled into the growing trays and pasteurized over a five day period. After cooling, the compost was innoculated mechanically with spawn and with the three combinations of particles. The spawn (vegetable mycelia) was allowed to colonize the compost for fourteen days. At that time, a layer of peat moss mixed with limestone chips was layered 1¾" thick on the top of the compost. Picking of the mushrooms commenced twenty-one days after the application of the peat moss layer. All trays were placed in standard commercial rooms and standard crop management practices were maintained.

The results of the experiment are summarized in Table I below. Each numerical entry is the average of two separate trays. The mushrooms were classified as being large (L), medium (M), small (S) or button, or #2 (mature). Large mushrooms have a cap diameter of greater than 2 inches and have a closed veil. Mediums range between 1 inch and 2 inches in cap diameter with closed veils. Button mushrooms are less than 1 inch with a closed veil. Mature or #2 mushrooms can be any size with the veil open or some other defect such as brown blotch, etc. The total yield figure reported in Table I is the yield of L, M, S and #2 mushrooms per square foot of compost. The bioefficiency is the unit weight of mushrooms produced per unit weight of compost.

Examination of the data shows that Osmoprotectants I and II produced higher yields and bioefficiencies in the later breaks as compared to the Nutrient. The undenatured material, Osmoprotectant II, produced the best results yielding about 0.78 lbs/ft² more mushrooms than were obtained with the delayed release nutrient of the prior art.

providing the osmoprotectant activity at the cropping point wherein it is needed most. The delay of the release is accomplished by the denaturization of the protein carrier particle 10 and by controlled agglomeration of the combined particle 70, such that the osmoprotectant particle provides a metered resistance to biological degradation. During the initial development of each flush, the mushroom mycelia are not sufficiently mature and vigorous to be able to penetrate the carrier particles to reach the phospholipid material absorbed thereonto. During the later phases of growth of each flush, however, the mycelia will begin to break down the protective layers surrounding the phospholipids. By selection of protein size and degree of denaturation in the embodiment 10, and by selection of surface to volume ratio and amount of wax coating in the embodiment 70, mycelial access to the phospholipid materials can be regulated such that mycelia access to the phospholipids will not occur until approximately the third or fourth flush. After this point, sufficient breakdown in the carrier particles will have occured such that the phospholipid materials are readily available to the mycelia of the remaining flushes. The phospholipid materials are readily accessible and give the mushroom mycelia cell and ability to balance the osmotic pressure inside and cell with that of the environment.

The various components of the particles of the preferred embodiment have been described in terms of readily available and inexpensive materials. Those skilled in the art will recognize that proteins other than soy bean may be utilized and that additional phospholipids will serve equally well. The various steps of the method for preparing the osmoprotectant particles may be varied slightly without materially effecting the result. Furthermore, the specific ingredients and ratios utilized in the method may be altered to accomplish specific desired purposes.

TABLE I

| Material Added | % Material Added | % L | % M | % S | % #2 | Total Yield Break 1 (lbs/ft²) | Bioefficiency Break 1 |
|---|---|---|---|---|---|---|---|
| FIRST BREAK SIZING | | | | | | | |
| Nutrient | 6% | 36.4 | 41.8 | 14.8 | 7.1 | 2.35 | .342 |
| Osmoprotectant I and Nutrient | 6% | 29.2 | 44.4 | 18.5 | 7.8 | 2.13 | .325 |
| Osmoprotectant II and Nutrient | 6% | 45.0 | 39.2 | 9.4 | 6.4 | 2.64 | .388 |
| SECOND BREAK SIZING | | | | | | Total Yield Break 1 + 2 (lbs/ft²) | Bioefficiency Break 1 + 2 |
| Nutrient | 6% | 22.3 | 35.8 | 19.4 | 22.5 | 4.36 | .635 |
| Osmoprotectant I and Nutrient | 6% | 26.9 | 39.6 | 20.8 | 12.7 | 4.36 | .668 |
| Osmoprotectant II and Nutrient | 6% | 31.7 | 36.0 | 17.0 | 15.3 | 4.98 | .721 |
| THIRD BREAK SIZING | | | | | | Total Yield Breaks 1 + 2 + 3 (lbs/ft²) | Bioefficiency Breaks 1 + 2 + 3 |
| Nutrient | 6% | 62.6 | 20.8 | 6.2 | 10.4 | 4.84 | .706 |
| Osmoprotectant I and Nutrient | 6% | 55.0 | 26.8 | 11.1 | 8.3 | 4.90 | .748 |
| Osmoprotectant II and Nutrient | 6% | 54.1 | 21.2 | 8.7 | 15.9 | 5.62 | .826 |

The osmoprotectant particles 10 and 70 of the present invention are of particular value in that they are specific for mushroom mycelia of the later stages or breaks, thus Although the present invention has been described in terms of the presently preferred embodiments, it is to be understood that such disclosures are not to be interpreted as limiting. Various alterations and modifications will no doubt become apparent to those skilled in the art after having read the above disclosure. Accordingly, it is intended that the appended claims be interpreted as covering all alternations and modifications as fall within the true spirit and scope of the invention.

I claim:

1. An osmoprotectant particle for enhancing fungus growth comprising:
   a protein carrier particle, generally spherical in structure, including a plurality of recessed attachment sites; and
   a plurality of osmoprotectant droplets, smaller in size that said carrier particle and having a core formed by the hydrocarbon tails of a water soluble phosphoglyceride material surrounded by an osmoprotectant layer, said osmoprotectant layer comprising the polar head of the phosphoglyceride material, said droplets being attached to said plurality of recessed attachment sites to be substantially surrounded by the carrier particle such that release of said osmoprotectant layer occurs only during the latter flushes of the mushroom crop when the carrier particle has been partially broken down by mycelia of earlier flushes.

2. The osmoprotectant particle of claim 1 wherein, said phsphoglyceride material is hydroxy lecithin.

3. The osmoprotectant particle of claim 1 wherein, said plurality of recessed attachment sites comprise surface and internal convolutions, and said droplets are further surrounded by a plurality of protein cross-links.

4. The osmoprotectant particle of claim 1 further including an osmoprotectant material admixed with the osmoprotectant layer.

5. The osmoprotectant particle of claim 4 wherein, the osmoprotectant material is chosen from the group consisting of betaine, choline, glycine betaine, betaine aldehyde, trimethyl-amino butyrate, dimethyl glycine, proline and proline-betaine.

6. An osmoprotectant particle for enhancing fungus growth comprising:
   a plurality of neutral carrier particles having a plurality of recessed attachment sites;
   a plurality of osmoprotectant droplets, smaller in size than said neutral carrier particles and having a core formed by the hydrocarbon tails of a water soluble phosphoglyceride material surrounded by an osmoprotectant layer, said osmoprotectant layer comprising the polar head of the phosphoglyceride material and said droplets being attached to said recessed attachment sites of the neutral carrier particle; and
   the plurality of neutral carrier particles are coagglomerated in a matrix whereby a combined osmoprotectant particle is formed.

7. The osmoprotectant particle of claim 6 wherein, said phosphoglyceride material comprises hydroxy lecithin.

8. The osmoprotectant particle of claim 6 wherein, a surface to volume ratio of the combined particle is chosen to be in the range of twenty-four hundredths square millimeters per cubic millimeter to eighteen hundredths square millimeters per cubic millimeter.

9. The osmoprotectant particle of claim 6 wherein, said matrix includes a starch.

10. The osmoprotectant particle of claim 6 wherein, said combined particle further includes a coating of a neutral wax substance.

11. The osmoprotectant particle of claim 6 wherein, the neutral carrier particles comprise a biologically inert material.

12. A method for producing an osmoprotectant particle comprising:
   (a) preparing a plurality of carrier particles, each having a plurality of recessed interior and exterior attachment sites for receiving a plurality of osmoprotectant droplets;
   (b) preparing a suspension of osmoprotectant droplets and carrier by mixing together a water soluble phosphoglyceride material and the carrier particles and blending the resultant mixture to form a blended mixture; and
   (c) drying the resultant product.

13. The method of claim 12 and further including, adding betaine to said suspension prior to said blending.

14. The method of claim 12 wherein,
   the carrier particles comprise a soy protein which has been ground, defatted and stripped of impurities;
   said phosphoglyceride material comprises hydroxy lecithin; and
   potassium permanganate is added to the blended mixture prior to drying to further denature and cross link the soy protein carrier.

15. The method of claim 12 wherein,
   the carrier particles comprise a biologically inert material; and
   the blended mixture is agglomerated prior to drying utilizing a one to three percent starch solution.

16. The method of claim 15 wherein,
   the dried agglomerated particles are coated with a layer of a neutral wax to further restrict mycelial access thereto.

* * * * *